United States Patent [19]
Sabatella, Jr. et al.

[11] 3,987,621
[45] Oct. 26, 1976

[54] METHOD FOR REDUCING JET EXHAUST TAKEOFF NOISE FROM A TURBOFAN ENGINE

[75] Inventors: Joseph Sabatella, Jr., South Windsor; Henry James Kane, Jr., Vernon, both of Conn.

[73] Assignee: United Technologies Corporation, Hartford, Conn.

[22] Filed: July 18, 1975

[21] Appl. No.: 597,268

Related U.S. Application Data
[63] Continuation-in-part of Ser. No. 476,127, June 3, 1974.

[52] U.S. Cl. ................................ 60/204; 60/224; 60/226 R; 60/262; 239/265.25; 181/33 HB
[51] Int. Cl.² .......................................... F02K 3/04
[58] Field of Search ................ 60/204, 226 R, 224, 60/263, 262; 239/265.19, 265.25; 181/33 HB

[56] References Cited
UNITED STATES PATENTS

| | | | |
|---|---|---|---|
| 3,102,385 | 9/1963 | Lyons | 60/224 |
| 3,477,230 | 11/1969 | Bauger et al. | 60/224 |
| 3,481,427 | 12/1969 | Dobbs et al. | 60/226 R |
| 3,579,993 | 5/1971 | Tanner | 60/262 |
| 3,673,803 | 7/1972 | McDonald | 181/33 HB |
| 3,742,711 | 7/1973 | Timms | 60/226 R |
| 3,830,431 | 8/1974 | Schwartz | 181/33 HC |

Primary Examiner—Carlton R. Croyle
Assistant Examiner—Robert E. Garrett
Attorney, Agent, or Firm—Robert C. Walker

[57] ABSTRACT

In a turbofan engine for jet aircraft the inner stream includes no noise suppression apparatus and the jet exhaust noise generated at takeoff is reduced by mechanically suppressing the jet exhaust noise of the outer stream and operating the engine at a bypass ratio, fan pressure ratio and gas generator power setting which yield a jet exhaust noise level from the suppressed outer stream which is louder than the jet exhaust noise level from the unsuppressed inner stream.

5 Claims, 7 Drawing Figures

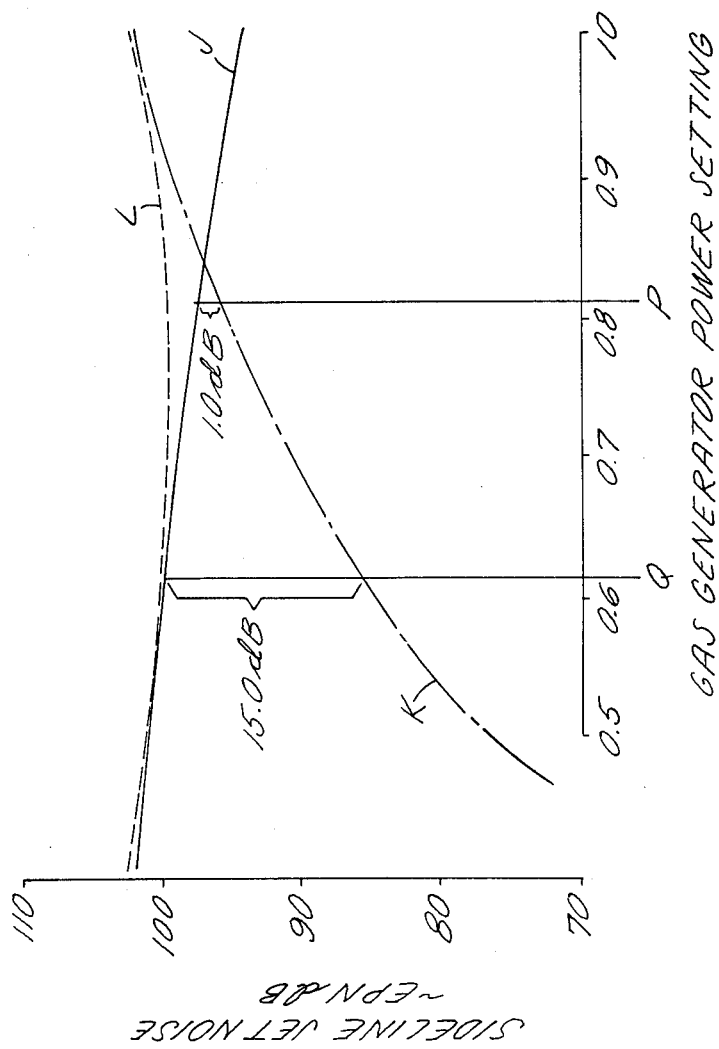

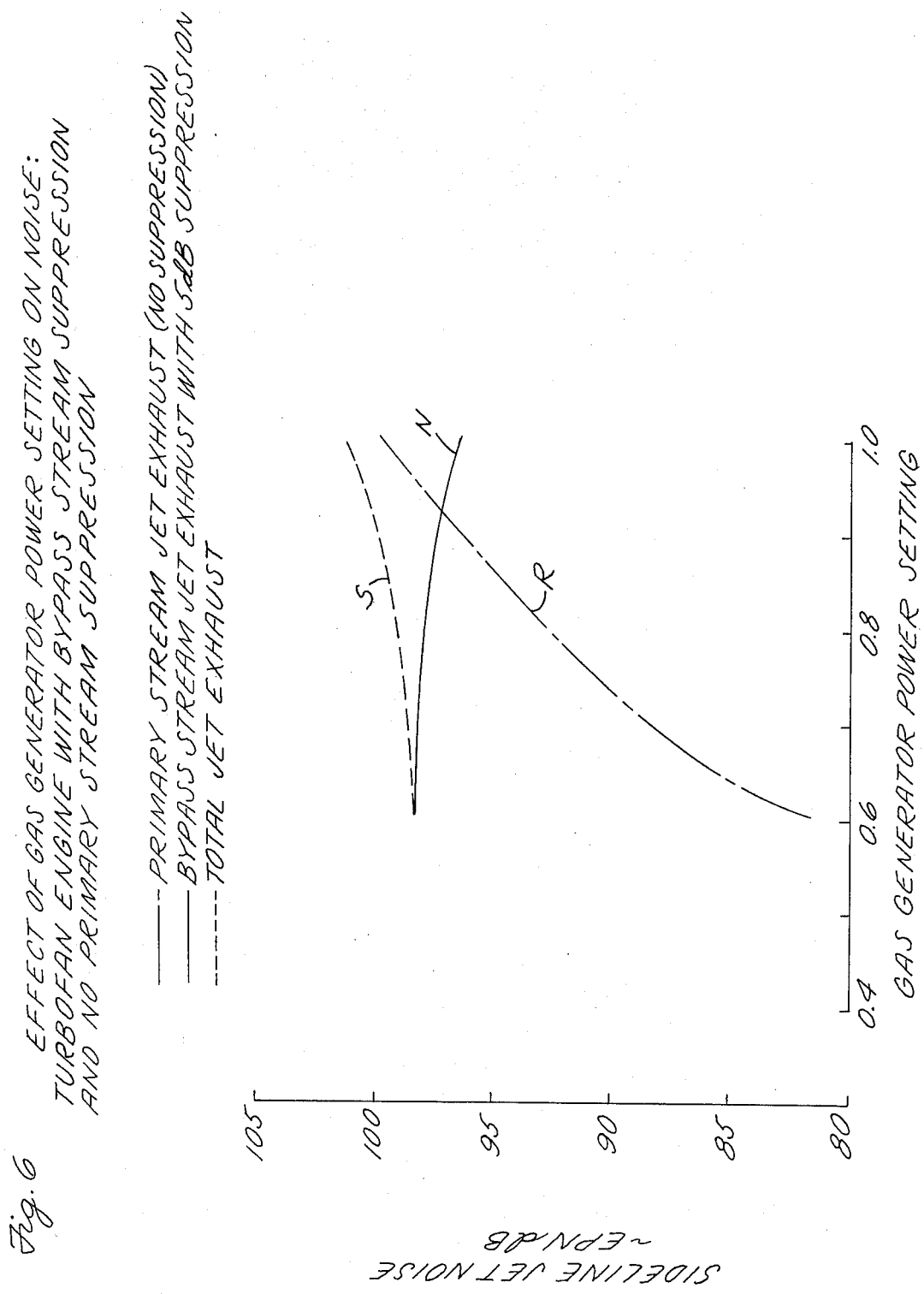
Fig. 6 EFFECT OF GAS GENERATOR POWER SETTING ON NOISE: TURBOFAN ENGINE WITH BYPASS STREAM SUPPRESSION AND NO PRIMARY STREAM SUPPRESSION

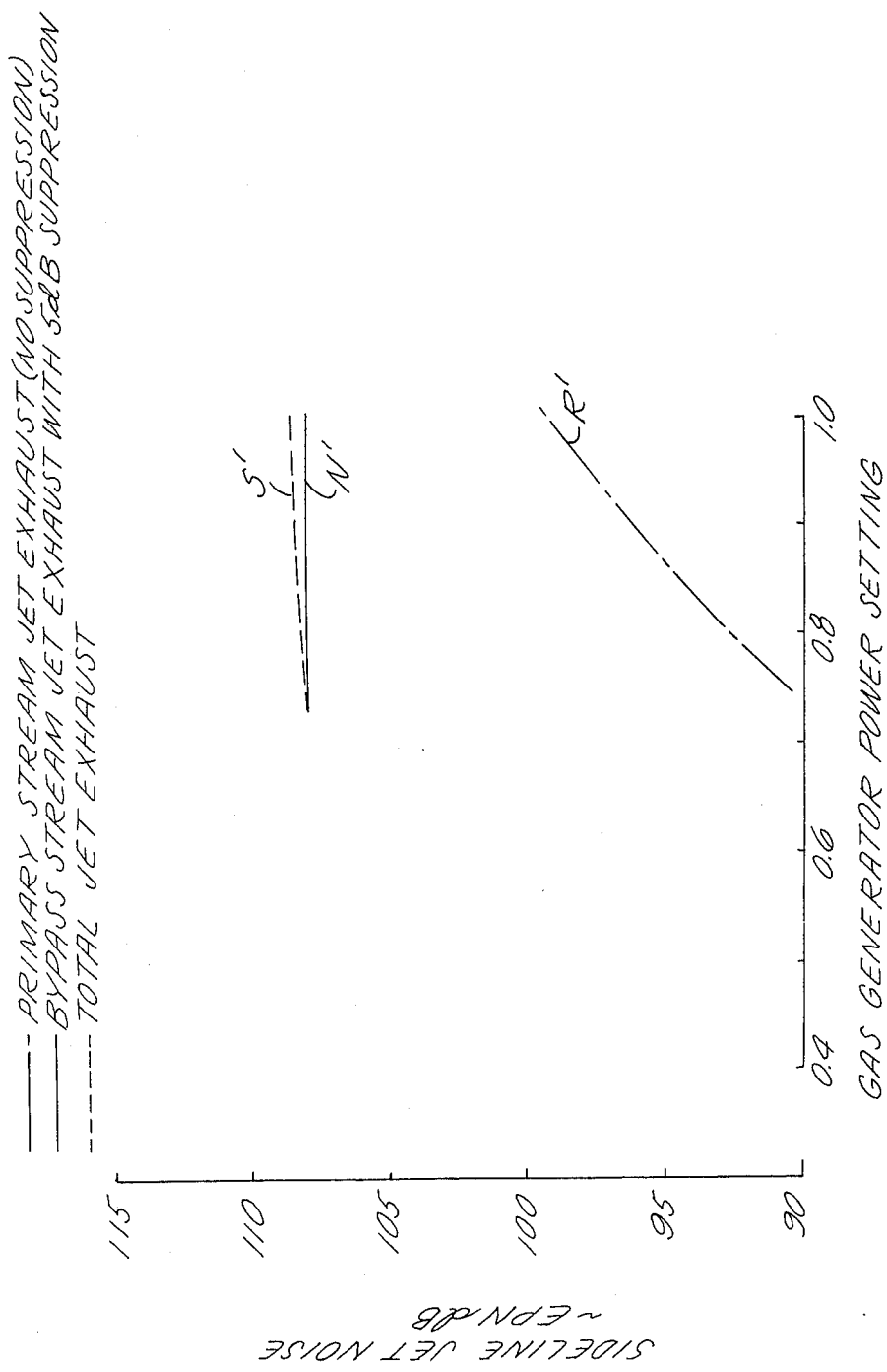

METHOD FOR REDUCING JET EXHAUST TAKEOFF NOISE FROM A TURBOFAN ENGINE

This is a continuation-in part of application Serial No. 476,127, filed June 3, 1974.

BACKGROUND OF THE INVENTION

1. Field of the Invention

This invention relates to reducing jet exhaust noise produced by a jet engine.

2. Description of the Prior Art

Jet engine noise around airports has always been a problem; but only recently has there been increased pressure on engine manufacturers to make their engines quieter, particularly at takeoff. One type of noise which contributes heavily to the overall noise of a jet engine is the noise created by the high velocity exhaust gases. This is a broad band noise covering a wide range of frequencies as opposed to noise created, for example, by compressor stages or by the burner which is noise of a relatively narrow frequency band. The latter type of noise may be reduced by using acoustic materials in the walls of the gas stream tuned to the narrow frequency range of concern. These acoustic materials have little effect on the broad band noise of the exhaust gases which are related almost wholly to the velocity of the exhaust gases.

A common type of engine today is the turbofan or bypass engine which includes an inner primary or core stream surrounded by an outer bypass stream. For conventional subsonic transports, the jet noise problem has been alleviated with the advent of the high bypass turbofan which has relatively large mass flow rates for the amount of thrust produced. These engines have low jet velocities, and hence, low jet noise.

Utilization of these high bypass turbofans in certain applications, such as a supersonic transport, may lead to unacceptable penalties in the total airplane performance and economics. For efficient operation, the supersonic transport requires engines of relatively low mass flow rate for the amount of thrust produced, resulting in high jet velocities and high jet noise. The engines considered appropriate for the supersonic transport are the turbojet and the low bypass ratio turbofan, which would then require jet noise suppression devices to reduce their jet noise to acceptable levels.

The supersonic transport engines of prior art usually operate at takeoff with a combination of bypass ratio, fan pressure ratio, turbine inlet temperature, and augmentation level (i.e. cycle selection) which yields a primary gas stream jet exhaust noise which is higher than the acceptable maximum total noise level within which the engine must operate. In some prior art designs, the bypass flow may be augmented, with the result that the bypass flow may also exceed the acceptable maximum noise level when the engine is operated at the required thrust level. In other prior art designs, the primary and bypass flow may be mixed and possibly augmented to some extent, but this results in the common flow exceeding the acceptable maximum noise level when operated at the required thrust level. In view of this, prior art engines for efficient supersonic transports were always required to include jet noise suppression apparatus in the primary stream, in both streams simultaneously or across the common exhaust of both streams to reduce the total noise to an acceptable level.

It is logical to ask why, in these prior art engines, higher bypass ratios or lower turbine inlet temperatures have not been used to lower the primary jet velocities and reduce the noise level of the primary gas stream, since increasing the bypass ratios and lowering the turbine inlet temperature does not significantly increase the noise level (or velocity) of the bypass stream. The reason for not having done this is because, although the noise level of the primary stream can be considerably reduced by this technique, the reduction in total engine exhaust noise level is not substantial and, in any event, it is not high enough to compensate for the performance losses at the higher bypass ratios or lower turbine inlet temperatures.

SUMMARY OF THE INVENTION

One object of the present invention is to reduce jet exhaust noise of a bypass engine at takeoff.

Another object of the present invention is to reduce the jet exhaust noise of a turbofan engine at takeoff while eliminating the need for sound suppressing apparatus in the inner gas stream or the common gas stream.

Accordingly, in the present invention, wherein a jet engine includes an outer stream and no noise suppression apparatus for the inner stream, the method for reducing takeoff jet exhaust noise includes the step of operating the engine at a bypass ratio, fan pressure ratio and turbine inlet temperature which yields a jet exhaust noise level from the suppressed outer stream which is louder than the jet exhaust noise level from the unsuppressed inner stream and, in one embodiment, includes mechanically suppressing the jet exhaust noise of the outer stream during takeoff.

In a particular embodiment of the present invention, wherein the inner stream is the primary stream and the outer stream is the bypass stream, the engine is operated so that the primary stream jet exhaust noise level at takeoff is at least 1.0 dB less than the suppressed bypass stream jet exhaust noise level by throttling the burner of the primary gas stream (i.e. reducing the gas generator power setting) so that it operates off-design (i.e. at less than full power) at takeoff and maintaining the total airflow through the engine at the same or higher level as it was before throttling. The bypass stream may be augmented at takeoff so that the total net thrust of the engine is sufficient for takeoff.

A careful analytical analysis of bypass engine noise leads to the conclusion that, contrary to what appears to be logical, for certain turbofan engine cycles suppression of the noise from the outer stream alone is almost as effective in reducing the total jet exhaust noise from the engine as is suppressing both the outer and the inner gas streams simultaneously and is significantly more effective than suppressing the inner stream alone.

Additionally, it was discovered that a simple change in the operating mode at takeoff can maximize the effectiveness of outer stream noise suppression apparatus to achieve a significant reduction in the total engine jet exhaust noise level.

Hereinafter the noise levels shown in the drawing and stated in the remainder of the specification are calculated based on the SAE AIR–876 method which is a well known standard method for calculating noise levels.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIGS. 2–7 are graphs illustrating the noise reduction obtained by the method of the present invention.

DESCRIPTION OF THE PREFERRED EMBODIMENT

Figure 1:
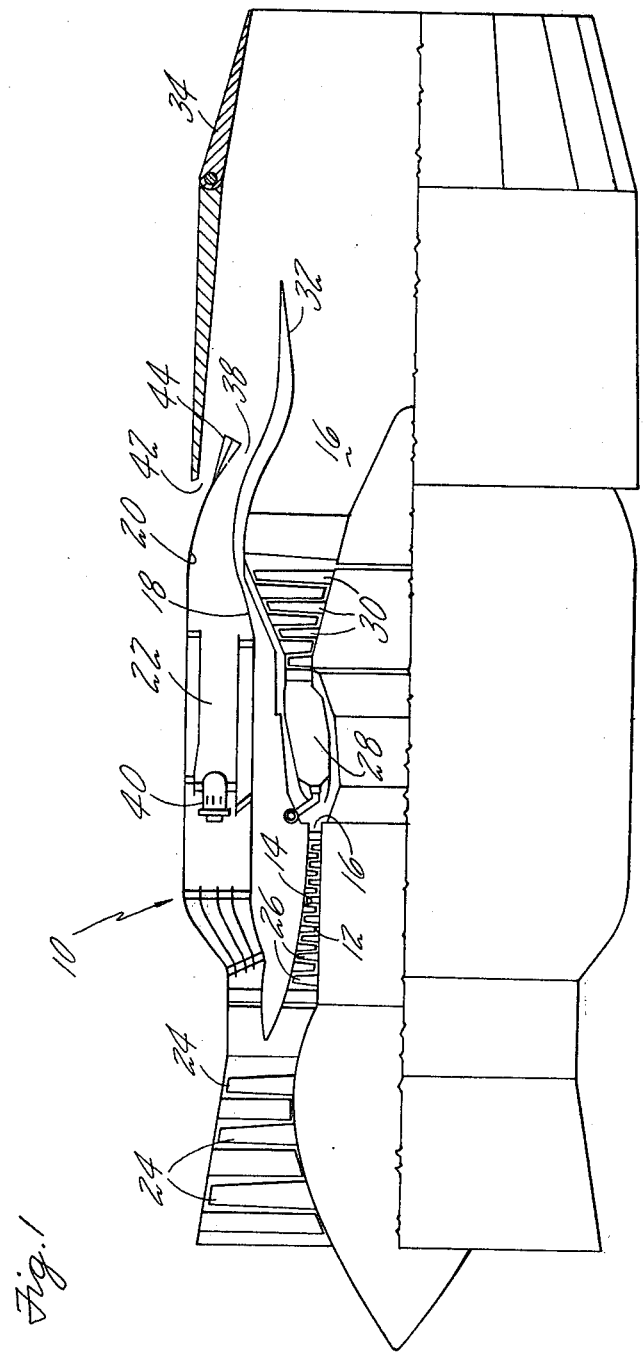
FIG. 1 is a cross-sectional elevation view of a supersonic turbofan engine.

Consider, in regard to a preferred embodiment of the subject invention, the supersonic bypass or turbofan engine 10 shown in FIG. 1. The engine 10 includes inner and outer wall means 12, 14, respectively, defining a primary gas stream flow path 16, and inner and outer duct means 18, 20, respectively, defining an annular bypass duct 22 for carrying the bypass gas stream. This particular engine 10 includes three fan stages 24 upstream of both the primary gas stream flow path 16 and the bypass duct 22, and a plurality of compressor stages 26 within the primary gas stream flow path 16. Downstream of the compressor stages 26 and also within the primary gas stream flow path 16 is an annular burner 28 followed by a plurality of turbine stages 30. The downstream end of the outer wall means 14 defines an exhaust nozzle 32 for the primary gas stream. The engine 10 also includes a variable area outer exhaust nozzle 34. The downstream end of the outer duct means 20 and the inner duct 18 define a bypass stream exhaust nozzle 38. Both the bypass gas stream and the primary gas stream exit through their respective nozzles 32, 38 into the common nozzle 34 from whence they are exhausted into the atmosphere. Positioned within the bypass duct 22 are a plurality of circumferentially spaced duct heaters or duct augmenters 40 which may be operated at will to augment the thrust generated by the bypass gas stream. The variable area exhaust nozzle 34 and the duct augmenters 40 are shown for the purpose of illustration only and their precise construction is not described in detail since such construction is not considered to be a part of the subject invention. Some embodiments of the present invention do not require a variable area exhaust nozzle. One example of a duct heater which may be used with this invention is described in Dooley et al. U.S. Pat. No. 3,780,530 of common assignee with the present invention.

The turbofan engine 10 also includes noise suppression apparatus for reducing the jet exhaust noise of the bypass duct 22. In this embodiment the outer duct means 20 has openings 42 therein for admitting tertiary air into the bypass duct 22. A mixing device 44 at the bypass stream exhaust nozzle throat causes vigorous mixing of the tertiary air with the bypass gas stream. The mixing device 44 is herein shown as being a portion of the duct 20 and is wave shaped in cross section looking axially upstream so that the tertiary air and the bypass gas stream are interweaved as they pass thereby. This vigorous mixing action reduces the bypass stream jet exhaust velocity and therefore the bypass stream jet exhaust noise. This technique for suppressing sound is shown only by way of example. The precise means and apparatus for reducing the jet exhaust in the bypass stream is not considered to be a part of the present invention. Many sound suppressing devices and techniques are well known in the art and may be used with the present invention such as the device shown and described in Langston, Jr. U.S. Pat. No. 3,463,402 of common assignee with the present invention.

The method of the present invention is not intended to be limited to a supersonic turbofan engine of the precise construction shown in FIG. 1. For example, the method of the present invention may have application in subsonic turbofan engines without duct heaters. Also, it may have application to a turbofan engine wherein the bypass stream is exhausted upstream of the exhaust nozzle of the primary gas stream. It may also have application to a turbofan engine wherein the bypass stream is exhausted in a wing jet/flap with the jet noise suppression being incorporated as part of the wing flap system.

The jet exhaust noise from the turbofan engine 10 is comprised of two basic components: the jet exhaust noise from the high velocity primary stream gases exiting from the nozzle 32 and the jet exhaust noise from the high velocity bypass gas stream exiting from the nozzle 38.

Figure 2:
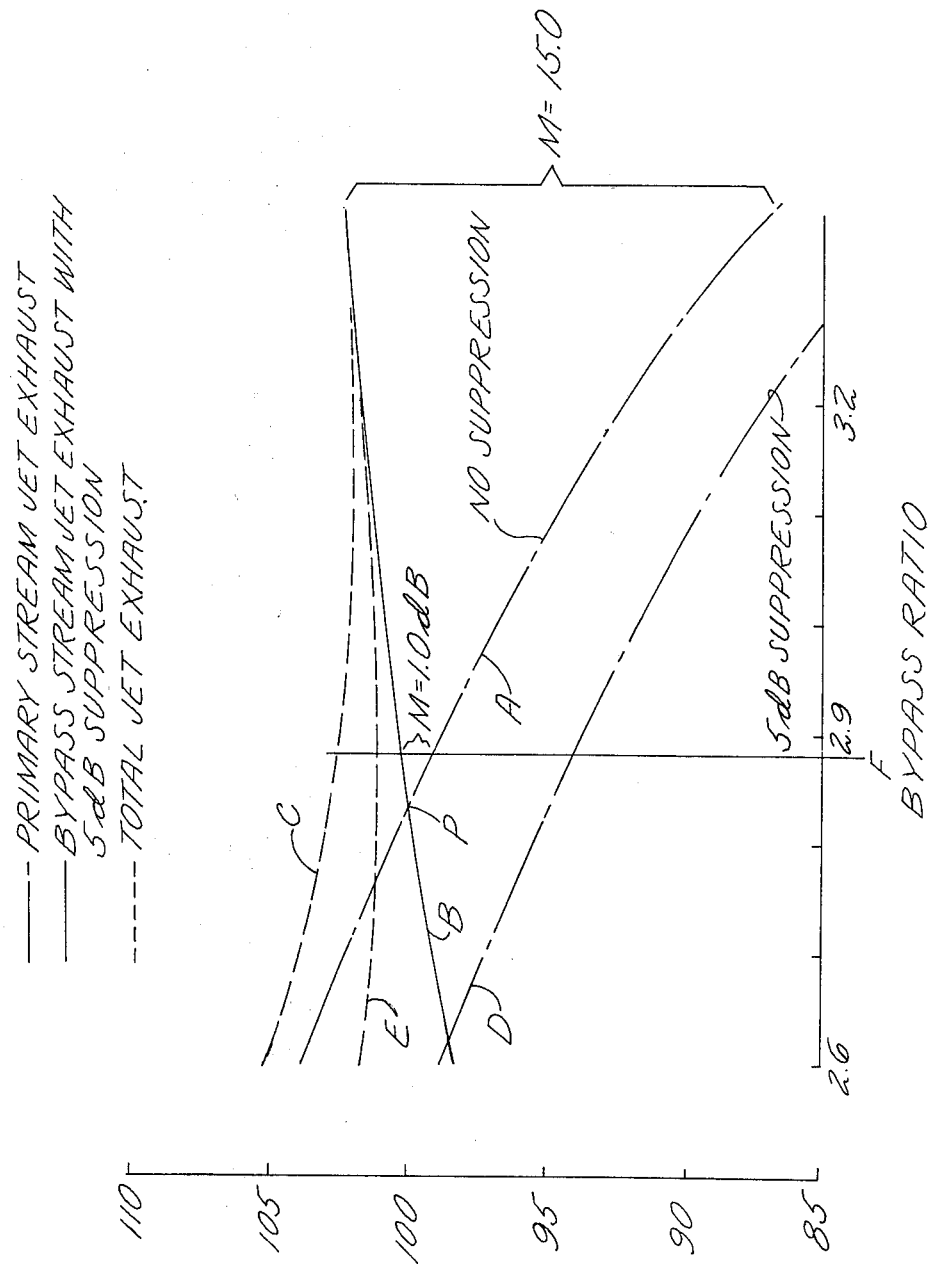

Consider, for the purpose of explaining the present invention, the graph of FIG. 2. The graph is a plot of sideline jet noise (as measured in decibels by SAE AIR–876) versus the bypass ratio of a turbofan engine. Fan pressure ratio and total mass flow rate are constant at 2.5 and 900 lbs/sec, respectively. The noise levels and the bypass ratios are for takeoff conditions. The bypass ratio is the ratio of the mass flow of air through the turbofan engine bypass duct to the mass flow of air through the primary stream; the fan pressure ratio is the air pressure exiting the fan relative to the air pressure entering the fan. The bypass stream includes duct heaters and in this example the bypass duct is augmented such that the total net thrust of the engine is 42,000 pounds. The curve A is a plot of the primary gas stream jet exhaust noise level without sound suppression apparatus; the curve B is a plot of the bypass gas stream jet exhaust noise level with sound suppression apparatus in the bypass stream which reduces the noise level of the bypass jet exhaust by 5 decibels (dB) everywhere along the curve; the curve C is the total noise produced by a turbofan engine having primary gas stream and bypass gas stream noise curves A and B. The curves A, B and C are representative of curves which would be obtained from an engine similar in appearance to the turbofan engine 10 of FIG. 1 which includes bypass stream noise suppression but no primary stream noise suppression. From FIG. 1 it can be seen that as the bypass ratio is increased the primary gas stream noise falls off dramatically (because of reduced primary exhaust gas velocity) while the bypass gas stream noise level increases steadily but at a slower rate. Generally an increase in bypass ratio has no effect on the velocity of the gases in the bypass stream and the curve B would be almost horizontal; however, in the example depicted in this graph the increase in bypass ratio reduces the thrust produced by the primary stream and the augmentation of the bypass stream has to be steadily increased to maintain the total net thrust at 42,000 pounds; the increase in duct augmentation results in an increase in the exhaust gas velocities and thus an increase in bypass gas stream noise. The total noise as depicted by the curve C decreases steadily at first and then levels out to a noise level barely higher than the noise level of the bypass gas stream itself. At bypass ratios in excess of 3.2, curve B continues its rise from left to right and the total noise begins to go back up.

If noise suppression apparatus is added to the primary gas stream which reduces the noise level of the primary gas stream by 5 dB, then the curve A would change to the curve D and the total noise curve would be depicted by the curve E, which is the exhaust gas stream noise of a turbofan engine with noise suppression apparatus in both the bypass gas stream and the primary gas stream. Comparing curves C and E it can be seen that at the lower bypass ratios there is a significant reduction in the total noise level; but, from a bypass ratio of about F to the end of the graph there is only a difference of 1.5 dB or less in the total noise despite the 5 dB suppression of the primary gas stream throughout the entire range of bypass ratios.

It is evident from FIG. 2 that for a turbofan engine having a primary stream noise suppressor (curve E) there is not much noise advantage in operating at a bypass ratio of greater than about 2.7. On the other hand, without primary gas stream noise suppression (curve C) there is a clear advantage to operating at bypass ratios greater than F as compared to bypass ratios less than F. It has been found that the minimum desirable bypass ratio F is always at a bypass ratio where the noise level of the bypass gas stream is at least about 1.0 dB higher than the noise level of the primary gas stream. This difference is labeled M in FIG. 2. Actually, satisfactory results are obtained in this particular situation at bypass ratios wherein M is anywhere from 1.0 to about 15.0; on either side of this range the noise level begins to reach levels wherein one might as well revert back to primary stream suppression or low bypass ratios.

It is interesting to note that for bypass ratios of F or greater (up to about where $M = 15.0$) there is hardly 1.5 dB more noise that even the lowest noise level of the curve E—this again despite 5.0 dB noise suppression apparatus in the primary gas stream. The surprising conclusion is that by operating at a higher bypass ratio the complex, expensive, and heavy primary gas stream noise suppression apparatus may be eliminated with hardly a noise penalty. 5.0 dB noise suppression apparatus is used only by way of example; the actual amount of suppression will depend on the characteristics of the jet suppression apparatus employed.

Figure 3:
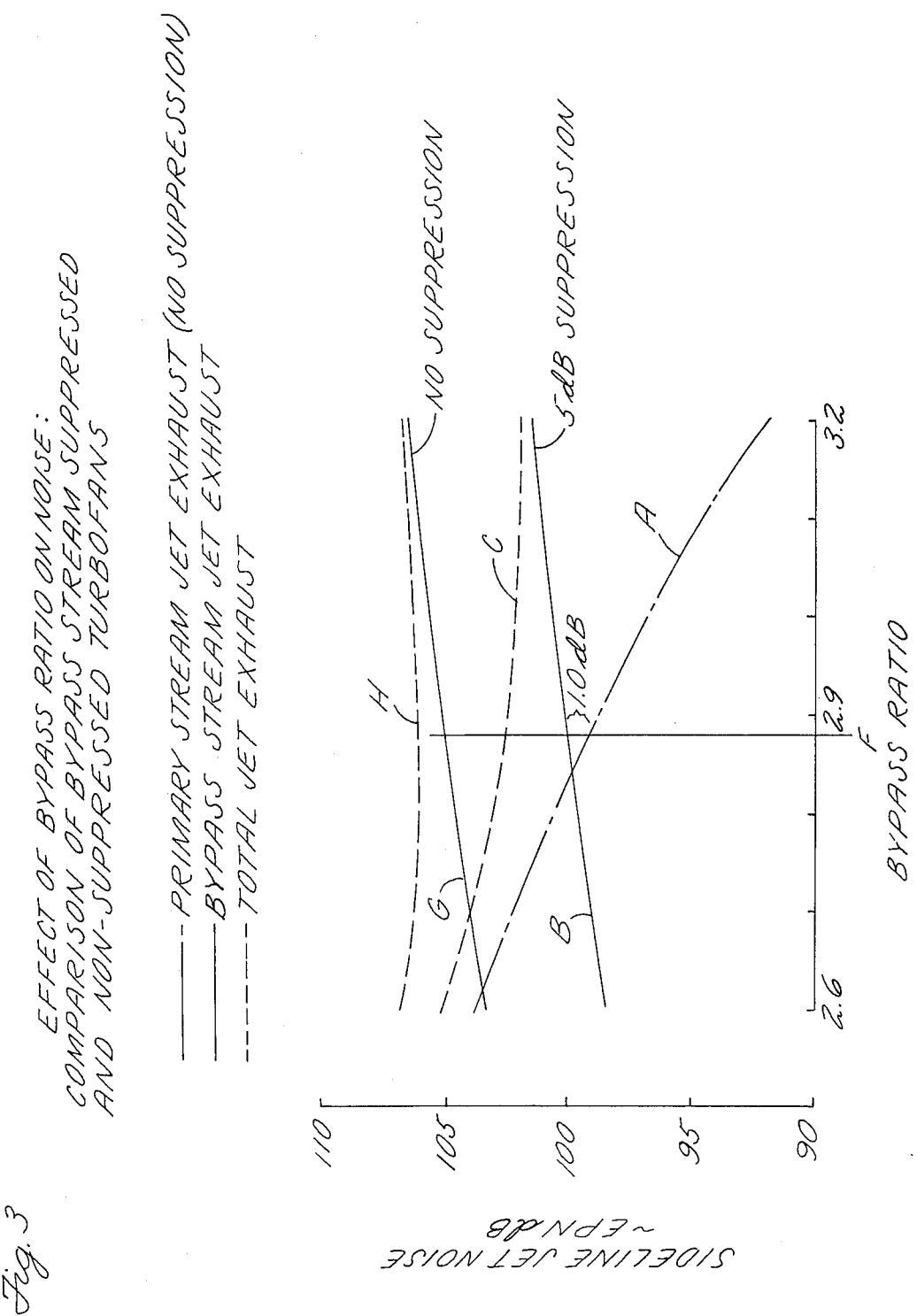

The graph of FIG. 3 is included for the purpose of comparison with the graph of FIG. 2. The turbofan engine is the same as the one represented by the graph of FIG. 2. The curves A, B and C are identical to the curves A, B and C of FIG. 2; in addition a curve G has been added which represents the level of noise from the bypass gas stream but without noise suppressing apparatus therein. Note that the noise level of the curve G is everywhere 5 dB greater than the noise level of the curve B. The sum of the noise from the curves G and A is curve H and is the total noise of a turbofan engine with no jet exhaust noise suppression apparatus in either duct. By comparing the curve H with the curve C it can be seen that 5 dB of noise suppression in the bypass duct yields anywhere from about 2 to almost 5 dB of total noise suppression, with about 4 dB of total noise suppression for bypass ratios above F. This compares favorably to the amount of total noise suppression obtained by suppressing the primary gas stream as well, such as by comparing the curves C and E of FIG. 2. Note that from a jet noise viewpoint, the optimum bypass ratio increases to a higher level when a bypass duct suppressor is incorporated (curve C) compared to the case when no suppressor is used (curve H).

Figure 4:
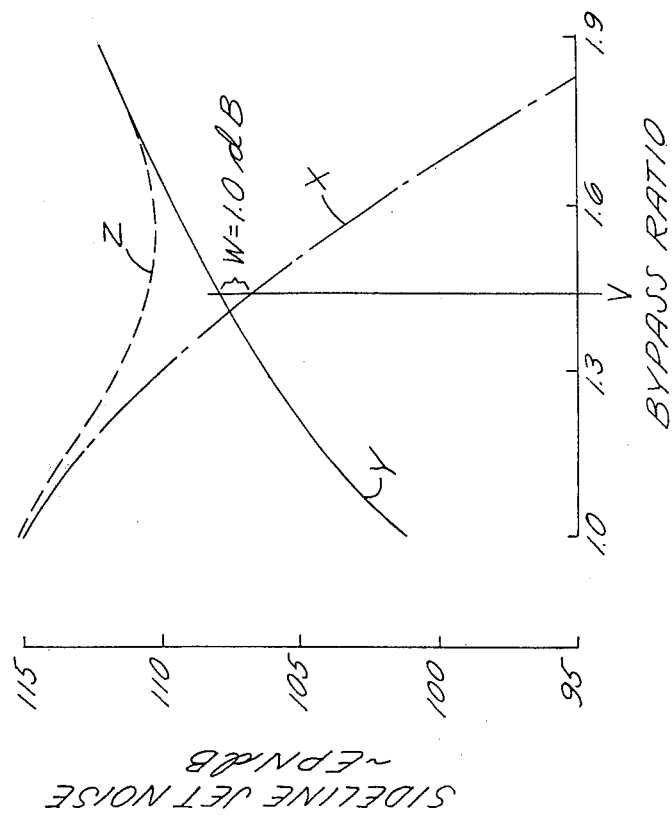

The graph of FIG. 4 is similar to the graphs of FIGS. 2 and 3 but is for a turbofan engine wherein the fan pressure ratio and the mass flow rate is maintained constant at 4.1 and 900 lbs/sec, respectively, for all bypass ratios. The curve X represents the noise level of the jet exhaust from the primary gas stream without noise suppression; the curve Y represents the noise level of the bypass gas stream with noise suppression apparatus therein for reducing the noise level 5 dB; and the curve Z represents the total noise level. Once again the best results are obtained for a bypass ratio of greater than V which is the bypass ratio wherein the noise level from the suppressed bypass gas stream is about 1.0 dB greater than the noise level from the primary gas stream. This difference in noise level is labeled W on the graph. Note that the curve Z reaches a low point at a bypass ratio of about 1.55 and then begins to go back up again. For the engine represented by this graph the bypass duct is augmented to maintain a total net thrust of 50,000 pounds.

FIG. 5 shows that similar results can be obtained by throttling the primary gas stream (i.e. reducing the gas generator power setting). In this embodiment the total mass flow rate through the engine as well as the fan pressure ratio are maintained substantially constant such as by varying the gas stream exhaust areas with variable area nozzles as the fuel flow to the primary burner is reduced. In this example the mass flow rate is maintained at 900 lbs/sec and the fan pressure ratio is maintained at about 2.5. The design bypass ratio is 2.6, which is the bypass ratio at a gas generator power setting of 1.0, but this will vary as the gas generator power setting is reduced since the fan pressure ratio and the total mass flow rate are maintained about constant. The bypass duct is augmented to maintain a constant total net thrust of 40,000 pounds. The curve J represents the noise level of the bypass gas stream with noise suppression apparatus therein; the curve K represents the noise level of the primary gas stream without noise suppression apparatus; and the curve L represents the total noise level. Note that the gas generator power setting should be reduced to at least P (about 0.80 in this instance) for best results. Once again, at P the noise level of the bypass gas stream is about 1.0 dB higher than the noise level of the unsuppressed primary gas stream. Preferably, for this particular case, the gas generator power setting should be somewhere between P and Q so that the noise level of the bypass gas stream is anywhere from about 1.0 to 15.0 dB greater than the noise level from the unsuppressed primary gas stream.

The graph of FIG. 6 is somewhat similar to the graph of FIG. 5 except that the fan pressure ratio is not maintained constant as the gas generator power setting is reduced. In FIG. 6 the curve N represents the noise level of the bypass gas stream with sound suppression apparatus; the curve R represents the noise level of the primary gas stream without noise suppression apparatus; and the curve S represents total noise level. The bypass duct is augmented to maintain a constant total net thrust of 38,000 pounds. The mass flow rate is maintained constant at 900 lbs/sec. The bypass ratio at a gas generator power setting of 1.0 is 2.1 and the fan pressure ratio at a gas generator power setting of 1.0 is 3.3. Preferably, as in the other cases, the gas generator power should be reduced to the point wherein the noise level of the bypass duct gas stream is at least 1.0 dB greater than the noise level of the unsuppressed primary gas stream. In this example extending the curves N and R below a gas generator power setting of 0.6 would result in a further reduction in the total noise since the fan pressure ratio is not maintained constant; thus, only the practical limits of efficient engine operation dictate the minimum gas generator power setting.

With regard to the embodiments represented by the graphs of FIGS. 5 and 6 it has been found that the present invention is not particularly suited to reducing noise unless the noise level of the unsuppressed primary gas stream is greater than the noise level of the suppressed bypass gas stream at a gas generator power setting of 1.0 as it is in the graphs of FIGS. 5 and 6. This is illustrated by the graph of FIG. 7. In FIG. 7 the mass flow rate, design fan pressure ratio and the design bypass ratio are the same as that of FIG. 6 but the bypass duct has been augmented to achieve a total net thrust of 50,000 pounds. The result is that at a gas generator power setting of 1.0 the suppressed bypass gas stream noise level represented by the curve N' is greater than the unsuppressed primary gas stream noise level represented by the curve R'. It can be seen from the total noise level curve F' that for this particular mode of takeoff operation there is hardly any noticeable noise reduction by reducing the gas generator power setting.

Although the invention has been shown and described with respect to a turbofan engine wherein the bypass stream from the engine flows through the exhaust nozzle as the outer stream and the primary stream from the engine flows through the exhaust nozzle as the inner stream, one skilled in the art will recognize the invention relies on the outer positional relationship of the stream with the highest noise level rather than the engine source of that stream. Accordingly, the bypass ratio, gas generator power setting and fan pressure ratio are adjusted to yield a jet exhaust noise level in the outer stream which is greater than the noise level of the inner stream regardless of whether the engine source of the outer stream is bypass flow or primary flow.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for reducing the takeoff jet exhaust noise produced by a jet engine having an outer stream and an unsuppressed inner stream including the step of
    operating the engine, at takeoff, with a combination of bypass ratio, gas generator power setting and fan pressure ratio which yields a jet exhaust noise level from the outer stream which is at least 1.0 dB louder than the jet exhaust noise level during takeoff from the unsuppressed inner stream.

2. The invention according to claim 1 which further includes the step of
    mechanically suppressing the jet exhaust noise of the outer stream during takeoff.

3. The method according to claim 1 wherein at takeoff the gas generator power setting is 1.0.

4. The invention according to claim 1 wherein the source of the gases comprising the outer stream is the engine bypass stream and the source of the gases comprising the inner stream is the engine primary stream.

5. The invention according to claim 1 wherein the source of the gases comprising the outer stream is the engine primary stream and the source of the gases comprising the inner stream is the engine bypass stream.

* * * * *